United States Patent
Caruk et al.

(10) Patent No.: US 10,698,856 B1
(45) Date of Patent: Jun. 30, 2020

(54) ALTERNATIVE PROTOCOL SELECTION

(71) Applicants: ATI Technologies ULC, Markham (CA); Advanced Micro Devices, Inc., Santa Clara, CA (US)

(72) Inventors: Gordon Caruk, Brampton (CA); Gerald R. Talbot, Concord, MA (US)

(73) Assignees: ATI Technologies ULC, Markham (CA); Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/223,873

(22) Filed: Dec. 18, 2018

(51) Int. Cl.
| G06F 13/20 | (2006.01) |
| G06F 13/42 | (2006.01) |
| G06F 13/376 | (2006.01) |
| G06F 13/38 | (2006.01) |
| G06F 13/16 | (2006.01) |
| G06F 13/22 | (2006.01) |

(52) U.S. Cl.
CPC ...... *G06F 13/4221* (2013.01); *G06F 13/1678* (2013.01); *G06F 13/22* (2013.01); *G06F 13/376* (2013.01); *G06F 13/387* (2013.01)

(58) Field of Classification Search
CPC .. G06F 13/00; G06F 13/4221; G06F 13/1678; G06F 13/22; G06F 13/376; G06F 13/387
USPC ................. 710/313, 105, 305, 100
See application file for complete search history.

(56) References Cited

U.S. PATENT DOCUMENTS

| 2014/0173164 A1 | 6/2014 | Ranganathan et al. |
| 2016/0085707 A1 | 3/2016 | Song et al. |
| 2016/0267048 A1 | 9/2016 | Pethe et al. |
| 2018/0095920 A1 | 4/2018 | Kwak et al. |
| 2018/0329855 A1 | 11/2018 | Das Sharma |
| 2019/0131974 A1* | 5/2019 | Das Sharma ........... G06F 3/017 |

(Continued)

OTHER PUBLICATIONS

"PCI Express® Base Specification-Revision 3.0"; White Paper; PCI-SIG; 3855 SW 153rd Drive, Beaverton, OR 97003; United States; Nov. 10, 2010; 860 pages.

(Continued)

*Primary Examiner* — Tim T Vo
*Assistant Examiner* — Kim T Huynh
(74) *Attorney, Agent, or Firm* — Polansky & Associates, P.L.L.C.; Paul J. Polansky; Nathan H. Calvert

(57) ABSTRACT

A link controller, method, and data processing platform are provided with dual-protocol capability. The link controller includes a physical layer circuit for providing a data lane over a communication link, a first data link layer controller which operates according to a first protocol, and a second data link layer controller which operates according to a second protocol. A multiplexer/demultiplexer selectively connects both data link layer controllers to the physical layer circuit. A link training and status state machine (LTSSM) selectively controls the physical layer circuit to transmit and receive first training ordered sets over the data lane, and inside the training ordered sets, transmit and receive alternative protocol negotiation information over the data lane. In response to receiving the alternative protocol negotiation information, the LTSSM causes the multiplexer/demultiplexer to selectively connect the physical layer circuit to the second data link layer controller.

20 Claims, 6 Drawing Sheets

(56) References Cited

U.S. PATENT DOCUMENTS

2019/0147923 A1\* 5/2019 Pawlowski .......... G11C 7/1075
711/149
2019/0303318 A1 10/2019 Mao et al.

OTHER PUBLICATIONS

International Search Report; International Application No. PCT/US2019/038531; dated Oct. 8, 2019; 3 pages.
Written Opinion of the International Searching Authority; International Application No. PCT/US2019/038531; dated Oct. 8, 2019; 8 pages.
Action on the Merits by U.S.P.T.O regarding U.S. Appl. No. 16/427,020, filed May 30, 2019.

\* cited by examiner

ALTERNATIVE PROTOCOL SELECTION

BACKGROUND

System interconnect bus standards provide for communication between different elements on a chip, or different elements with a multi-chip module, a circuit board, a server node, or in some cases an entire server rack or a networked system. For example, the popular Peripheral Component Interconnect Express (PCIe or PCI Express) is a high-speed serial expansion bus providing interconnection between elements on a motherboard, and connecting to expansion cards. Improved system interconnect standards are needed for multi-processor systems, and especially systems in which multiple processors on different chips interconnect and share memory.

The interconnection of multi-processor computing resources and the associated memory poses several challenges. Generally, memory capacity requirements increase as the number of interconnected processors and accelerators increase. Furthermore, new interconnect standards may be incompatible with older standards, such as PCIe, and therefore render obsolete various system components and expansion devices which employ the older standards.

Figure 1:
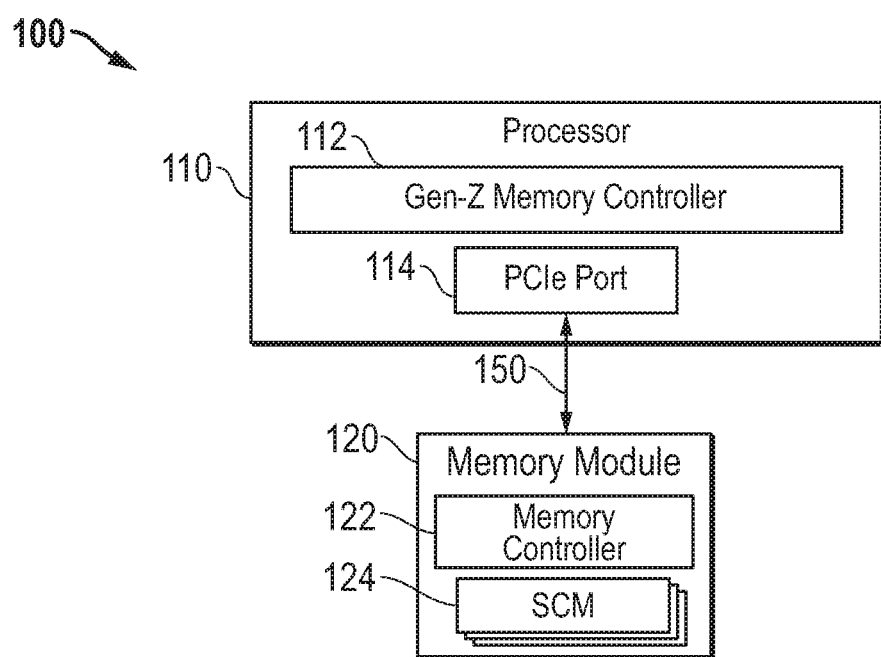
FIG. 1 illustrates in block diagram form a data processing platform with a PCIe memory module according to the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A link controller includes a physical layer circuit, first and second data link layer controllers, a multiplexer/demultiplexer, and a link training and status state machine (LTSSM). The link controller is connected to a communication link and provides a data lane over the communication link. The first data link layer controller operates according to a first protocol, and the second data link layer controller operates according to a second protocol. The multiplexer/demultiplexer is coupled to the first data link layer controller, the second data link layer controller, and the physical layer circuit. The LTSSM selectively controls the physical layer circuit to transmit and receive first training ordered sets over the data lane, and inside the training ordered sets, transmit and receive alternative protocol negotiation information over the data lane. The LTSSM also controls the physical layer to transmit and receive data rate information and link width information over the data lane. In response to receiving the alternative protocol negotiation information, the LTSSM causes the multiplexer/demultiplexer to selectively connect the physical layer circuit to the second data link layer controller.

A method includes transmitting and receiving first training ordered sets using a link controller circuit connected to a PCIe communication link to establish bit lock and symbol lock for a Peripheral Component Interconnect Express (PCIe) communication link. Modified training ordered sets are transmitted and received using a link controller circuit connected to a PCIe communication link. Inside the modified training ordered sets, alternative protocol negotiation information is transmitted and received over the data lane. Data rate information and link width information are also transmitted using the link controller circuit. In response to not receiving the alternative protocol negotiation information, the method causes the multiplexer/demultiplexer to selectively connect a physical layer circuit to a first data link layer controller for a first protocol. In response to receiving the alternative protocol negotiation information, the method causes the multiplexer/demultiplexer to selectively connect the physical layer circuit to a second data link layer controller for a second protocol. The PCIe communication link is subsequently operated.

A data processing platform includes a central processing unit and a dual-protocol link controller connected to the central processing unit. The dual-protocol link controller includes a physical layer circuit connected to a Peripheral Component Interconnect Express (PCIe) communication link, a first data link layer controller operating according to a first protocol, a second data link layer controller operating according to a second protocol, and a multiplexer/demultiplexer coupled to the first data link layer controller, the second data link layer controller, and the physical layer circuit. A link training and status state machine (LTSSM) controls the physical layer circuit to: (a) transmit and receive training ordered sets over the PCIe communication link; (b) inside the training ordered sets, transmit and receive alternative protocol negotiation information over the PCIe communication link; and (c) in response to receiving the alternative protocol negotiation information, cause the multiplexer/demultiplexer to connect the physical layer circuit to the second data link layer controller.

FIG. 1 illustrates in block diagram form a data processing platform 100 with a PCIe memory module 120 according to the prior art. Data processing platform 100 includes a processor 110 having a memory controller 112 and a PCIe port 114 connected to a PCIe bus 150. Expansion memory for data processing platform 100 is provided by a PCIe memory module 120 connected to PCIe bus 150. PCIe memory module 120 includes a memory controller 122 communicating with PCIe bus 150, and a storage class memory (SCM) 124, including multiple memory chips providing persistent memory storage.

Figure 2:
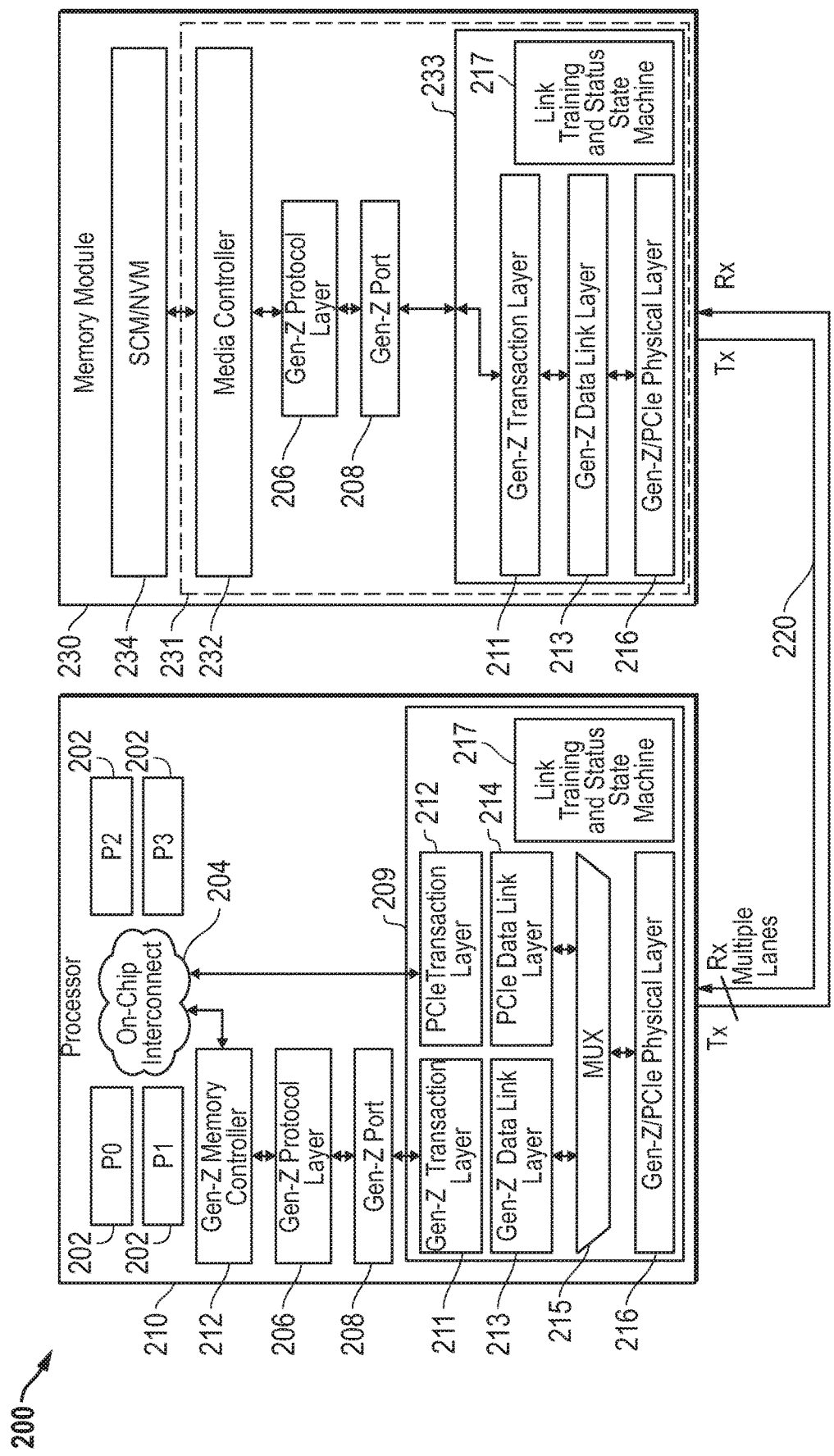
FIG. 2 illustrates in block diagram form a data processing platform according to some embodiments.

FIG. 2 illustrates in block diagram form a data processing platform 200 according to some embodiments. Processor 210 communicates with a memory module 230 using a Gen-Z protocol, which is a data access technology for enhancing memory solutions for existing and emerging memory technologies. The Gen-Z protocol is found in Gen-Z Core Specification 1.0 published by Gen-Z Consortium, Inc., and in later versions of the standard. Gen-Z provides an abstract device interface that supports a variety of memory types, including a number of byte-addressable, persistent storage class memory technologies. Gen-Z provides a platform for fabric attached memory, scaling from point-to-point connections to local memory expansion through local high-speed busses and switched busses, to rack-scale solutions. To support a variety of current and future memory subsystems, Gen-Z provides a universal interface between processors and their memory subsystems. With this interface, the components communicate using memory-semantic requests with application-specific semantic overlays to derive meaning and drive type-specific actions. Generally, host processor 210 communicates with memory module 230 over a PCIe bus 220, but is able to recognize that a Gen-Z device is connected and configure a dual-protocol link controller 209 to communicate using a Gen-Z protocol as an alternative protocol.

Host processor 210 includes four processor cores 202, interconnected by an on-chip interconnect network 204. This number of processor cores 202 is merely an example, and the processor cores employed for various data processing platforms will often include many more processor cores, such as 32 or 64 cores all connected with an on-chip interconnect network. As shown, on-chip interconnect network 204 links each processor core to a PCIe input of dual-protocol link controller 209 for PCIe traffic, and to Gen-Z memory controller 212 for memory access to memory module 230. In this embodiment, dual-protocol link controller 209 includes a Gen-Z/PCIe external port including PCIe hardware enhanced to include Gen-Z alternative protocol capability. This capability is provided by through virtual Gen-Z port 208, Gen-Z transaction layer controller 211, Gen-Z data link layer controller 213, and the PCIe physical layer circuit 216. Dual protocol link controller 209 provides a Gen-Z protocol interconnect to memory module 230 that is overlaid on a PCIe physical link on PCIe bus 220.

Gen-Z memory controller 212 typically includes processor memory management logic, and may include other logic circuits such as request queues or a memory directory. Gen-Z memory controller 212 sends and receives memory requests and responses through a connection to Gen-Z protocol layer 206, which prepares and formats messages according to the Gen-Z protocol. Gen-Z protocol layer 206 is connected Gen-Z port 208, which connects to Gen-Z transaction layer controller 211 of dual-protocol link controller 209.

Dual-protocol link controller 209 includes a Gen-Z transaction layer controller 211 is connected to Gen-Z port 208 for communicating memory access requests through Gen-Z port 208 in the upstream direction. Gen-Z transaction layer controller 211 is connected to Gen-Z data link layer controller 213 for providing and receiving Gen-Z packets in the downstream direction. Gen-Z data link layer controller 213 generally manages the Gen-Z communication link through PCIe bus 220, performing link setup, sequencing packets, and controlling the flow of data over the link.

Multiplexer/demultiplexer 215 selectively connects PCIe physical layer circuit 216 to Gen-Z data link layer controller 213 or PCIe data link layer controller 214, allowing a Gen-Z link or a PCIe link to be completed through PCIe physical layer circuit 216. PCIe physical layer circuit 216 is connected to multiplexer/demultiplexer 215, and operates to create signals for transmission over PCIe bus 220 through a unidirectional transmit port labeled "TX", and to receive signals over unidirectional receive port labeled "RX". The operation of multiplexer/demultiplexer 215 is controlled by settings provided during initialization of dual-protocol link controller 209 by link training and status state machine (LTSSM) 217, as further described below.

On chip interconnect 204 includes another path for processors 202 to communicate through dual-protocol link controller 209 using the PCIe protocol through connection to PCIe transaction layer controller 212. This path is provided for normal PCIe traffic, allowing PCIe capable devices to be connected to PCIe bus 220 as an alternative or in addition to the memory module 230, which operates with a Gen-Z protocol. A PCIe device may be connected to different PCIe lanes of PCIe bus 220 than those used by memory module 230. PCIe transaction layer controller 212 is connected to PCIe Data Link layer controller 214, which selectively connects to PCIe physical layer circuit 216 through multiplexer/demultiplexer 215, as further described below. PCIe transaction layer controller 212 and PCIe Data Link layer controller 214 operate as known in the art.

The blocks of dual-protocol link controller 209 can be implemented with various combinations of hardware, firmware, and software. In this embodiment, dual protocol link controller 209 is implemented entirely in hardware. In another exemplary implementation, PCIe physical layer circuit 216 is implemented in hardware, PCIe transaction layer controller 212 is implemented in software, and PCIe data link layer controller 214 is implemented partially in hardware and partially in software. Gen-Z protocol layer 206 is implemented in software, Gen-Z transaction layer controller 211 is implemented partially in hardware and partially in software, and Gen-Z data link layer controller 213 is implemented in hardware.

Memory module 230 may be an expansion card type module with a PCIe connector, or may take the form of other expansion modules and/or be built into the motherboard carrying host processor 210. Memory module 230 includes a memory 234 with one or more memory chips connected to an interface controller 231 over a high-speed local bus. Interface controller 231 includes a media controller 232, a Gen-Z protocol layer 206, a virtual Gen-Z port 208, and a link controller 233. Media controller generally executes memory access requests to memory 234. Gen-Z protocol layer 206 is connected to media controller 232 and prepares and formats messages according to the Gen-Z protocol. Gen-Z protocol layer 206 connects to a virtual Gen-Z port 208 in the downstream direction. Virtual Gen-Z port 208 serves as a logical port for Gen-Z communications from media controller 232, and connects to Gen-Z transaction layer controller 211 of link controller 233.

Link controller 233 includes Gen-Z transaction layer controller 211, Gen-Z data link layer controller 213, PCIe physical layer circuit 216, and LTSSM 217, which operate similarly to those elements in link controller 209. However, in link controller 233, no PCIe transaction layer, data link layer, or multiplexer are employed, allowing link controller 233 to only communicate with the Gen-Z protocol. PCIe physical layer circuit 216 of link controller 233 is connected to the transmission medium of PCIe bus 220 and transmits and receives Gen-Z protocol communications over PCIe bus 220. Multiple channels or a single channel may be used in the connection, running over multiple lanes of PCIe bus 320. LTSSM 217 of link controller 233 performs the functions of a PCIe LTSSM and negotiates use of the Gen-Z protocol as described below.

Memory module 230 may be used in a memory-centric architecture or a traditional, processor-centric architecture as each is supported by Gen-Z. In this example, memory 234 is a storage class memory (SCM) and is a nonvolatile memory (NVM). However, these examples are not limiting, and many types of memory modules may employ the techniques described herein. For example, a RAM memory, or a memory with mixed NVM and RAM may be used, such as a high-capacity flash storage or 3D crosspoint memory with a RAM buffer.

Media controller 232 may be integrated on an interface controller chip (231) with some or all of the port circuitry of dual-protocol link controller 209. The two LTSSMs 217 negotiate with each other during link initialization to notify host processor 210 that a Gen-Z device is present on PCIe bus 220, and to negotiate the connection protocol between host processor 210 and memory module 230. This negotiation preferably takes place as an addition to LTSSM training process that is part of PCIe link controllers as further described below.

Figure 3:
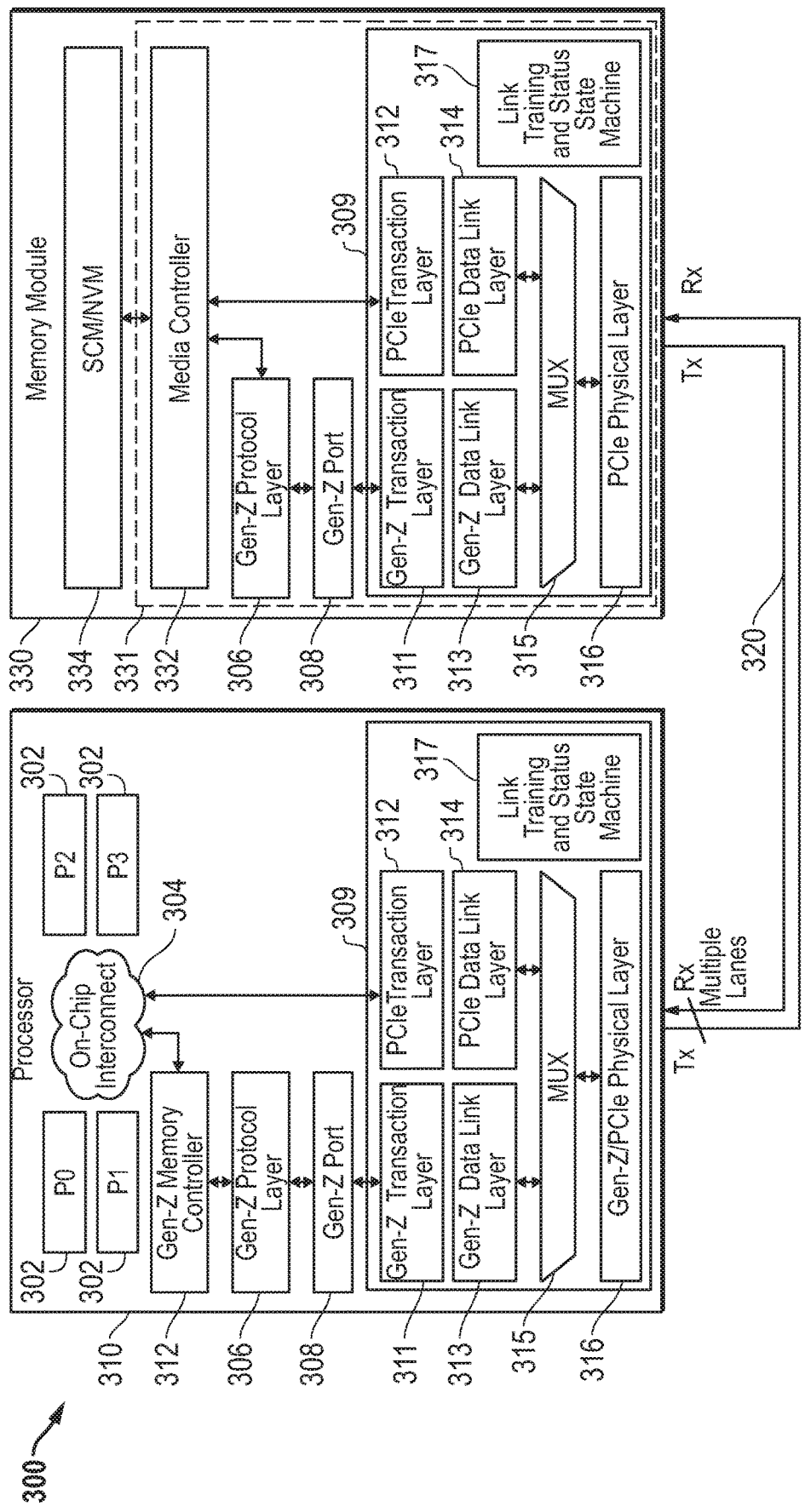
FIG. 3 illustrates in block diagram form another data processing platform according to some embodiments.

FIG. 3 illustrates in block diagram form a data processing platform 300. Generally, host processor 310 connects to a memory module 330 over a PCIe bus 320, recognizes that a Gen-Z device is connected, and configures the dual-protocol link controllers 309 of host processor 310 and memory module 330 accordingly. Host processor 310 is identical to host processor 210 of FIG. 2, with reference numbers to the corresponding elements beginning with "3" rather than "2".

Memory module 330 may be an expansion card type module with a PCIe connector, or may take the form of other expansion modules and or be built into the motherboard carrying host processor 310. Memory module 330 includes a memory 334 with one or more memory chips, and an interface controller 331. Interface controller 331 includes a media controller 332 and a dual-protocol link controller 309 connected to the transmission medium of PCIe bus 320. Multiple channels or a single channel may be used in the connection, running over multiple lanes of PCIe bus 320.

Media controller 332 and its associated Gen-Z protocol layer 306 operate to fulfill and respond to memory requests formatted in the memory semantic form provided by the Gen-Z protocol. Memory module 330 may be used in a memory-centric architecture or a traditional, processor-centric architecture as each is supported by Gen-Z. In this example, memory 334 is a storage-class, nonvolatile memory similar to that of memory module 230.

Media controller 332 may be integrated on an interface controller chip (331) with some or all of the port circuitry of dual-protocol link controller 309. Dual-protocol link controller 309 has elements 311, 313, 315, 316, 317, 312 and 314 like those of dual-protocol link controller 309 of host processor 310, except that processor 310 may include a full PCIe root complex in its dual-protocol link controller 309. The two LTSSMs 317 negotiate with each other during link initialization to notify host processor 310 that a Gen-Z device is present on PCIe bus 320, and to negotiate the connection protocol between host processor 310 and memory module 330 as further described below with respect to FIG. 5. Dual-protocol link controller 309 may be configured, typically through a register setting, to negotiate use of either a Gen-Z protocol or a PCIe protocol. This negotiation preferably takes place as an addition to LTSSM training process that is part of PCIe link controllers.

Figure 4:
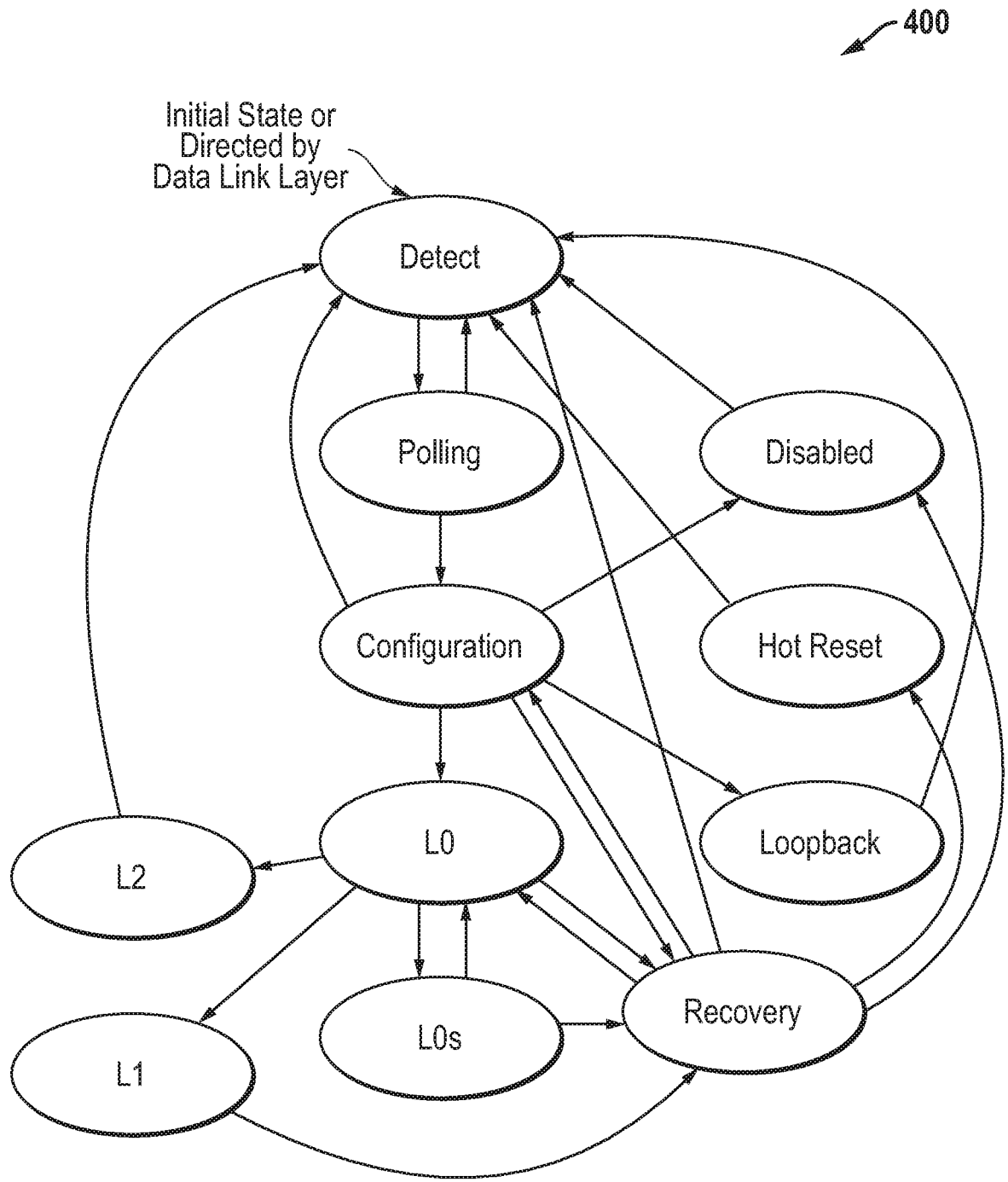
FIG. 4 shows in flow diagram form a state diagram for operating a prior art link training and status state machine (LTSSM).

FIG. 4 shows in flow diagram form a state diagram 400 for operating a prior art PCIe LTSSM. As set forth the PCIe standard, the LTSSM typically provides a physical layer control process that configures and initializes each link for operation. The LTSSM performs the functions of configuring and initializing the PCIe link, supporting packet transfers, recovering from link errors, and restarting a PCIe port from low power states. While configuring and initializing the PCIe link, the LTSSM first enters a Detect state where it detects the presence of a link partner on the lane, typically in response to the physical layer circuit being initialized, or commanded by the link layer as shown. From the Detect state, the LTSSM enters a Polling state in which bit and symbol lock, and lane polarity are established as the link partners exchange predetermined ordered sets of symbols, referred to as training set 1, "TS1" and training set 2, "TS2". These ordered sets contain patterns of bits that allow the transmitter and receiver to measure and adjust the transmitter and receiver performance over the particular transmission medium of each lane.

Then the LTSSM goes to the Configuration state, where the TS1 and TS2 ordered sets are again exchanged and parameters such as data rate, lane ordering, and link width are established. Then the LTSSM goes to the L0, which is the normal working state where data is transferred on the link. Various errors in the Configuration process can cause the LTSSM to go to through the Recovery state. The LTSSM may also go to electrical idle or standby state (L0s), lower power standby/slumber state (L1), a low power sleep state (L2), or a link Off state (L3).

Figure 5:
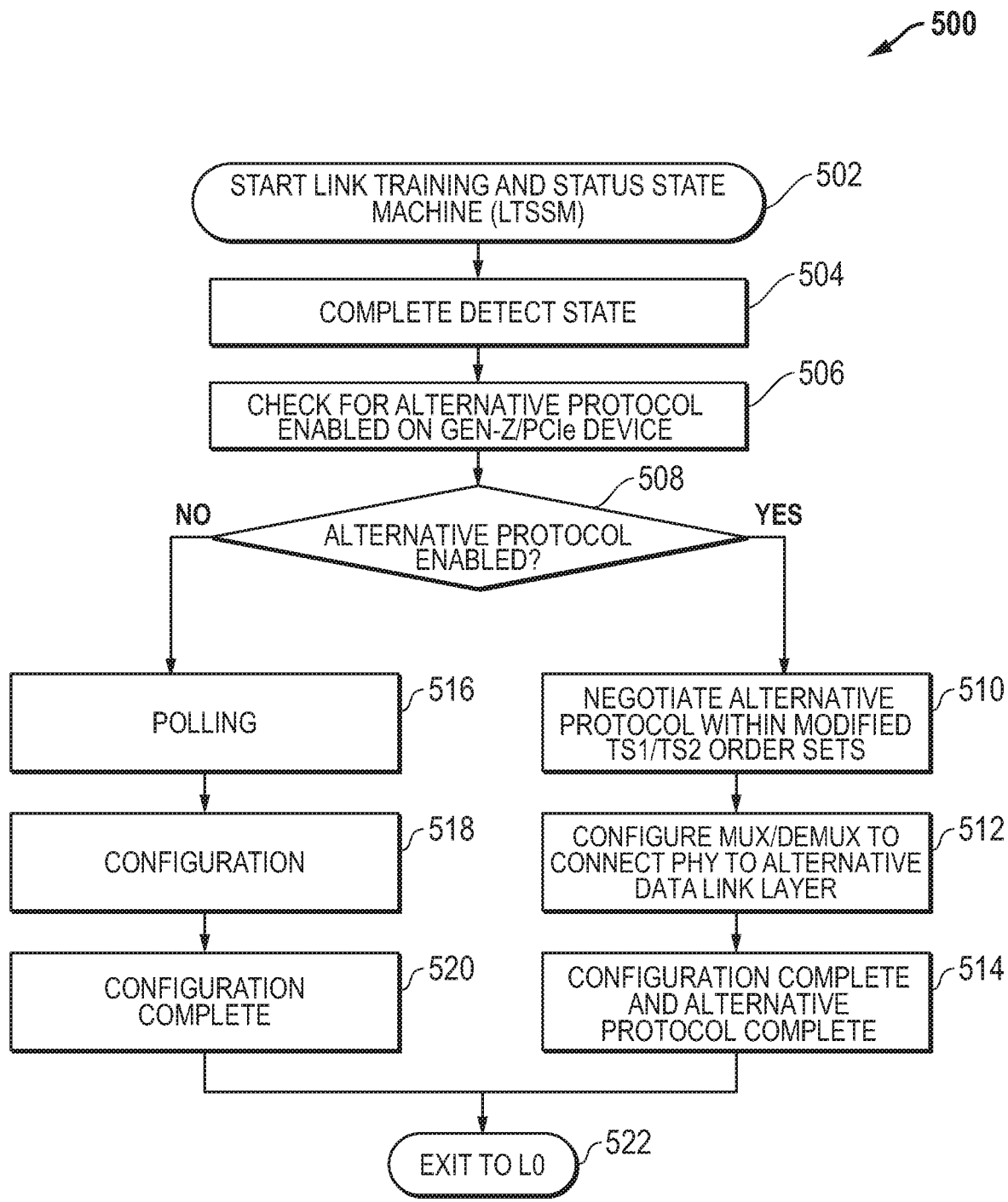
FIG. 5 shows in flow diagram form an example process for selecting an alternative protocol using an enhanced LTSSM according to some embodiments.

FIG. 5 shows in flow diagram form an example process 500 for selecting an alternative protocol using an enhanced LTSSM 317 according to some embodiments. Generally, process 500 is conducted by the enhanced LTSSM 317 controlling the PCIe Physical Layer circuit 316 (FIG. 3) at each end of a lane of the PCIe bus 320. Process 500 begins at process block 502 where enhanced LTSSM 317 is started, typically when the data processing platform is powered on or reset according to any suitable process, for example a cold reset or a hot reset. The enhanced LTSSM 317 may also be restarted in response to a command from the host processor, such as a command to leave a link standby state. At block 504, the enhanced LTSSM 317 completes the Detect state to detect the presence of a physical layer circuit transmitter or receiver at the opposite end of the lane. Then at block 506, enhanced LTSSM 317 checks for alternative protocols enabled on the attached device. The setting is typically initialized using a boot strap ROM, a pin set to a particular value, or some other suitable technique to set a designated value in the Gen-Z device register. Then the Gen-Z device checks the register to see that an alternative protocol, such as a Gen-Z transaction layer protocol, is enabled. The check is performed at the Gen-Z device end of the link to determine the preferred protocol with which to communicate, and may also be performed independently at the host processor end to determine whether an alternative protocol is supported or allowed. At the host processor, the setting may be stored in a register, which checked by the PCIe root complex.

If no alternative protocols are enabled, process 500 at block 508 goes to the normal PCIe LTSSM process where it completes the polling state at block 516, the configuration state at block 518, and upon completing the link configuration at block 520, exits to the L0 operating state at block 522. Block 518 may configure multiplexer/demultiplexer 315 of both I/O port controllers 309 at either end of the link to connect the PCIe data link layer controller 314 to PCIe physical layer circuit 316, or such connection may already be set as the default state. If the PCIe protocol is not enabled as a default, block 518 may also include transmitting PCIe protocol negotiation information identifying the PCIe protocol in the same manner that alternative protocol negotiation information is exchanged at block 510.

If an alternative protocol is enabled, referring to block 508, process 500 goes to block 510, where it negotiates the use of an alternative protocol by transmitting modified TS1 and TS2 ordered sets. The ordered sets are modified to insert information into the TS1 or TS2 set at the Gen-Z device end of the link indicating an alternative protocol is supported. The enhanced LTSSM 317 transmits and receives alternative protocol negotiation information over the data lane within the modified TS1 and TS2 ordered sets. The host processor 300 end of the link similarly acknowledges acceptance of the alternative protocol by inserting acknowledgement information into the TS1 or TS2 ordered set transmitted back to the Gen-Z device 330.

At block 512, process 500 configures the multiplexer/demultiplexer 315 of both I/O port controllers 309 at either end of the link, to connect the Gen-Z data link layer controller to PCIe physical layer circuit 316. Generally, if a Gen-Z protocol is supported at both ends of the link, the host processor 300 and Gen-Z device 330, the Gen-Z data link layer controller is used. If either end of the link only supports the PCIe protocol, then the PCIe data link layer controller 314 is used. At block 514, the configuration of the lane is completed by negotiating link speed, link width, and other relevant parameters.

This scheme enables the use of PCIe or Gen-Z communication in a manner transparent to the application layers of the system. It also allows the same physical transmission medium, the lanes of PCIe bus 320, often 16 or 32 lanes, to be used by both protocols. Because the alternative protocol negotiation is done on a lane-by-lane basis, a number of lanes may be used for a Gen-Z protocol (for example, a memory module) while other lanes are used for a PCIe protocol (for example, for peripheral devices). The techniques herein also allow for backward compatibility, as older PCIe devices do not interfere with the Gen-Z specific hardware. Further, use of these techniques within a data fabric allows processing elements multiple paths to reach a port of their choice and select a protocol of their choice.

Figure 6:
FIG. 6 shows in symbol sequence diagram form an unmodified ordered training set according to some embodiments.

FIG. 6 shows in symbol sequence diagram form an unmodified ordered training set 602 according to some embodiments. The unmodified training set generally consists two sets, each having 16 symbols used by the LTSSM to establish alignment and other link parameters during the Polling and Configuration states of the LTSSM.

Figure 7:
FIG. 7 shows in symbol sequence diagram from a modified ordered training set according to some embodiments.

FIG. 7 shows in symbol sequence diagram from a modified ordered training set 702 according to some embodiments. Modified ordered training set 702 may be a modified version of either or both of the TS1 or TS2 ordered training sets used by the LTSSM. Modified data 704 includes alternative link negotiation parameters, which identify the protocol to be employed, such as a Gen-Z protocol. The modified data includes at least one bit altered from the original TS1 or TS2 ordered set. The enhanced LTSSM 317 checks the position of the modified bits for altered data to determine if a modified ordered training set is received.

The techniques herein may be used, in various embodiments, with any suitable products (e.g. servers, data processing computers, database hosts) that employ memory modules or other peripherals that benefit from high speed communication links. Further, the techniques are broadly applicable for use data processors implemented with GPU and CPU architectures or ASIC architectures, as well as programmable logic architectures.

While particular embodiments have been described, various modifications to these embodiments will be apparent to those skilled in the art. For example, multiple alternative protocols may be enabled by the link controller and negotiated as described herein.

Accordingly, it is intended by the appended claims to cover all modifications of the disclosed embodiments that fall within the scope of the disclosed embodiments.

What is claimed is:

1. A link controller comprising:
   a physical layer circuit adapted to be coupled to a communication link and provide a data lane over said communication link;
   a first data link layer controller which operates according to a first Peripheral Component Interconnect Express (PCIe) protocol;
   a second data link layer controller which operates according to a second non-PCIe protocol;
   a multiplexer/demultiplexer coupled to the first data link layer controller, the second data link layer controller, and the physical layer circuit;
   a link training and status state machine (LTSSM) which selectively controls the physical layer circuit to:
   transmit and receive training ordered sets over the data lane;
   inside the training ordered sets, transmit and receive alternative protocol negotiation information over the data lane;
   transmit and receive data rate information and link width information over the data lane; and
   in response to receiving the alternative protocol negotiation information, cause the multiplexer/demultiplexer to selectively couple the physical layer circuit to the second data link layer controller.

2. The link controller of claim 1, wherein the second protocol is a Gen-Z protocol.

3. The link controller of claim 2, wherein:
   the alternative protocol negotiation information is included in modified training ordered sets.

4. The link controller of claim 3, wherein the LTSSM further selectively controls the physical layer circuit to:
   in response to receiving unmodified training ordered sets, cause the multiplexer/demultiplexer to selectively couple the physical layer circuit to the first data link layer controller.

5. The link controller of claim 2, further comprising:
   a Gen-Z transaction layer controller coupled to the second data link layer controller; and
   a PCIe transaction layer controller coupled to the first data link layer controller.

6. The link controller of claim 1, wherein the LTSSM transmits and receives the alternative protocol negotiation information based on status of a control register.

7. A method comprising:
   transmitting and receiving modified training ordered sets using a link controller circuit adapted to be coupled to a Peripheral Component Interconnect Express (PCIe) communication link;
   inside the modified training ordered sets, transmitting and receiving alternative protocol negotiation information over a data lane;
   transmitting and receiving data rate information and link width information using the link controller circuit;
   in response to not receiving the alternative protocol negotiation information, selectively causing a multiplexer/demultiplexer to connect a physical layer circuit to a first Peripheral Component Interconnect Express (PCIe) data link layer controller for a first protocol;

in response to receiving the alternative protocol negotiation information, selectively causing the multiplexer/demultiplexer to selectively couple the physical layer circuit to a second non-PCIe data link layer controller for a second protocol; and subsequently operating the PCIe communication link.

8. The method of claim 7, wherein the second protocol is a Gen-Z protocol.

9. The method of claim 7, further comprising, after selectively causing the multiplexer/demultiplexer to selectively couple the physical layer circuit to the second data link layer controller for the second protocol, operating the communication link with a Gen-Z protocol.

10. The method of claim 7, wherein transmitting and receiving alternative protocol negotiation information is performed through the physical layer circuit under control of a link training and status state machine (LTSSM).

11. The method of claim 7, wherein transmitting and receiving alternative protocol negotiation information is done based on a predetermined status of a control register.

12. A data processing platform comprising:
a central processing unit;
a dual-protocol link controller coupled to said central processing unit and comprising:
physical layer circuit coupled to a Peripheral Component Interconnect Express (PCIe) communication link;
a first data link layer controller adapted to operate according to a first Peripheral Component Interconnect Express (PCIe) protocol;
a second data link layer controller adapted to operate according to a second non-PCIe protocol;
a multiplexer/demultiplexer coupled to the first data link layer controller, the second data link layer controller, and the physical layer circuit;
a link training and status state machine (LTSSM) adapted to control the physical layer circuit to: (a) transmit and receive training ordered sets over the PCIe communication link; (b) inside the training ordered sets, transmit and receive alternative protocol negotiation information over the PCIe communication link; and (c) in response to receiving the alternative protocol negotiation information, cause the multiplexer/demultiplexer to connect the physical layer circuit to the second data link layer controller.

13. The data processing platform of claim 12, wherein the second protocol is a Gen-Z protocol.

14. The data processing platform of claim 13, further comprising:
a Gen-Z transaction layer controller coupled to the second data link layer controller; and
a PCIe transaction layer controller coupled to the first data link layer controller.

15. The data processing platform of claim 12, further comprising:
a memory module comprising a memory, a media controller coupled to the memory, and an interface controller coupled to the media controller and the PCIe communication link, the interface controller including a second LTSSM operable to transmit and receive training ordered sets over the PCIe communication link and inside the training ordered sets, transmit and receive alternative protocol negotiation information over the PCIe communication link.

16. The data processing platform of claim 15, wherein the second LTSSM is part of a second a dual-protocol link controller.

17. The data processing platform of claim 15, wherein the second LTSSM is part of a single-protocol link controller operating with the Gen-Z protocol.

18. The data processing platform of claim 15, further comprising:
a Gen-Z memory controller coupled between the central processing unit and the dual-protocol link controller, and operable to access the memory module using Gen-Z protocol memory requests.

19. The data processing platform of claim 15, further comprising a peripheral device coupled to the central processing unit, and communicating with the central processing unit with a PCIe protocol.

20. The data processing platform of claim 12, in which the LTSSM transmits and receives the alternative protocol negotiation information based on a predetermined status of a control register.

* * * * *